Nov. 30, 1937. L. L. SALFISBERG Re. 20,564

PRODUCT PACKAGING

Original Filed July 31, 1934 2 Sheets-Sheet 1

INVENTOR
Leroy L. Salfisberg
BY
Gordon B. Schiedell
ATTORNEY

Nov. 30, 1937. L. L. SALFISBERG Re. 20,564
PRODUCT PACKAGING
Original Filed July 31, 1934 2 Sheets-Sheet 2
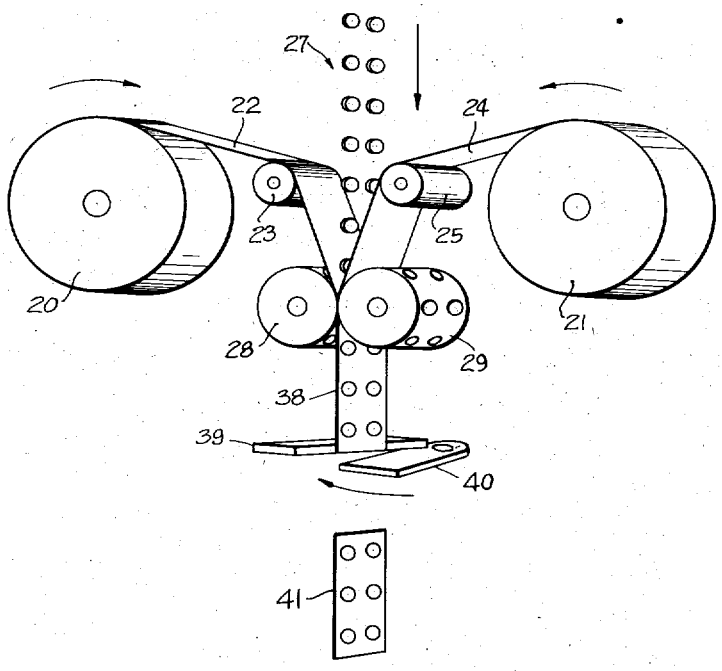
FIG. 11
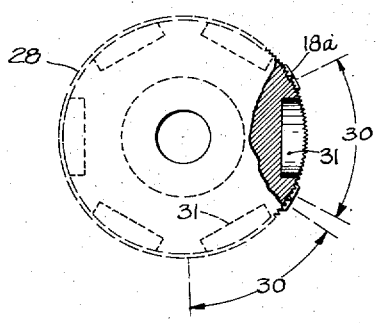
FIG. 12
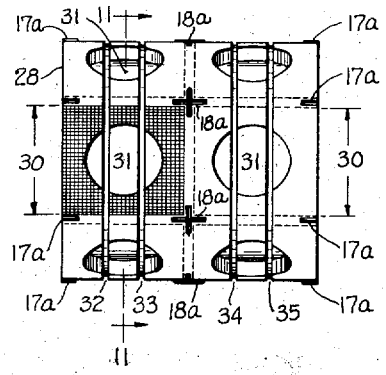
INVENTOR
Leroy L. Salfisberg
BY
Gordon B. Schiebell
ATTORNEY Reissued Nov. 30, 1937 Re. 20,564

UNITED STATES PATENT OFFICE 20,564

PRODUCT PACKAGING

Leroy L. Salfisberg, South Orange, N. J., assignor to Ivers-Lee Company, Newark, N. J., a corporation of Delaware Original No. 2,012,405, dated August 27, 1935, Serial No. 737,721, July 31, 1934. Application for reissue May 20, 1936, Serial No. 80,786

13 Claims. (Cl. 206—46)

My invention pertains in general to commodity packaging and specifically relates to a form of article package and the method of making the same.

One of the objects of my invention consists in providing a commodity package in which articles are maintained in sealed and sanitary condition subject to ready and easy access for consumption purposes.

Another object comprises providing a package and method of manufacture in which articles are sealed in packaging materials subjected to a heat treatment crimping process for producing an embrittled bond surrounding the packaged articles and forming a seal having facile tearing characteristics.

A further object consists in the production of a commodity package having a plurality of separably joined commodity-containing portions including means for producing guiding in the opening of such commodity-containing enclosure portions.

A further object comprises providing the production of a product package subject to a continuous manufacturing operation in which a multiplicity of packaged articles are maintained in staggered relationship for facilitating a subsequent folding process.

A still further object resides in the production of a product package having a fabrication including indicia inserts which may bear advertising and/or instructions associated with the packaged commodity.

I accomplish these and other desirable objects in a product package in which opposed layers of coated flexible packaging material are used to enclose commodity articles, the articles being surrounded by crimping of the packaging material in an embrittling process with guide lines and perforations spatially associated with the embrittled portions for permitting ease in tearing the package structure by the consumer in the use of the packaged articles.

In the drawings which accompany and form a part of this specification and in which like reference numerals designate corresponding parts throughout:

Fig. 10 is a schematic representation illustrating steps in the manufacturing method involved in the product packaging according to my invention;

Fig. 11 is a fragmentary sectional view taken along the line 11—11 of Fig. 12 representing the detailed construction of a type of processing element employed in the method depicted in Fig. 10; and Fig. 12 is a side view of the element shown in Fig. 11.

Figure 1:
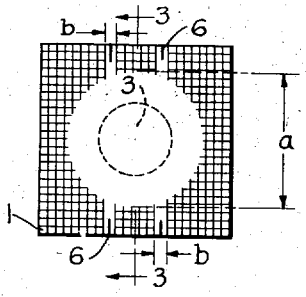
Fig. 1 is a plan view of a preferred embodiment of a unitary package in accordance with the principles of my invention.

My invention contemplates a type of product packaging for eliminating many of the difficulties heretofore attendant the packaging of articles and at the same time accomplishing many results which could not be obtained in the prior art. Heretofore in the art, bottles and boxes have commonly been employed for packaging articles such as are adaptable to use with my packaging process. It is well known that the consumer is required to open such enclosures each time he wishes to remove one of the packaged articles and this may in itself be a feature of considerable annoyance since boxes and bottles are very often not easily opened. At the same time, boxes and bottles do not maintain the articles in sanitary segregation and, of course, do not guard against deterioration in the manner effected by the package here disclosed.

In the product packaging of my invention, the consumer's requirements in all respects are considered in the fabrication of the package. First, consideration is given to the sanitary and hygienic aspects of the packaged article. In this direction, each of the packaged articles, such as medicinal pills, is packaged separately and in sealed moisture-proof enclosures so that the article is not subject to handling until actually used and is further not subject to deterioration by exposure. Second, the packaged articles are maintained between transparent material so that they are at all times visible to the consumer. This feature is of importance since the consumer can, by instant inspection, ascertain the condition and appearance of all of the packaged articles he has purchased. Such a feature is obviously of considerable advantage in the competitive sales of packaged articles. Third, the consumer is enabled to quickly and easily use the packaged articles without the annoyance and unsatisfactory conditions heretofore commonly encountered. To accomplish such a feature, the individual packaged articles are maintained in separate enclosures, all of which are separately attached to the package as a whole so that they can be individually removed as required by the consumer. Each of these article-containing portions comprises a structure in which the packaged article is enclosed by an embrittled area which is subject to easy tearing so that the enclosed article can be immediately and easily removed under sanitary and hygienic conditions. Special guide lines and perforation areas are provided to assist the consumer in this operation. This form of product is readily adapted to a continuous packaging process of simplified operations in which the packaging can be accomplished in an economical manner for competitive quantity production purposes. It will be noted that the package of my invention is especially adapted for the use of pharmaceutical products, such as pills, but of course many other uses will be apparent and my invention is therefore not to be limited to such use.

The detailed construction and manner of manufacturing of such a package will now be considered. Referring to the drawings in detail, and particularly to Figs. 1—3, there are provided opposed layers 1 and 2 of a packaging material. These layers are preferably composed of a transparent viscose material commercially known as "cellophane", and having a heat treatment coating thereon. Although such a preference is indicated for purposes of illustration, it should be understood that other forms of material are also adaptable for the purpose of producing a package according to my invention. In the drawings, particularly in the side and sectional views, the interdigitating or crimping is shown in enlarged relationship for purposes of better illustration.

Figure 2:
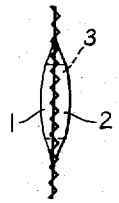
Fig. 2 is a side view corresponding to the representation of Fig. 1.
Figure 3:
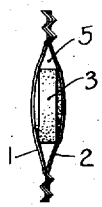
Fig. 3 is a sectional view taken along the line 3—3 of Fig. 1 to illustrate the structural detail in the fabrication of the unit shown in Fig. 1.

The opposed layers of viscose material 1 and 2 are positioned on opposite sides of the packaged commodity, which for the sake of illustration, is represented as a medicinal pill 3. The sheets 1 and 2 are of square configuration and the pill 3 is centrally positioned therebetween. In the area adjacent the edges of the square, the two sheets 1 and 2 are bonded together in an interdigitating heat treatment crimping process which joins the two sheets for the entire area except for the area "a", circular in formation, surrounding the pill 3, and for two areas "b", in the form of spaced parallel lines leading from the outside edges of the square into the circular area "a" as shown. The circular area "a", in which no crimping occurs, forms a recess 5 in the form of a separation of the layers 1 and 2 between which the pill 3 is positioned. The other areas in which no crimping occurs, designated by the lines "b", serve as guide lines for guiding the tearing of the embrittled area when the consumer wishes to remove the packaged article. The crimped bonded area treated in the crimping process is embrittled by the heat treatment so that the chemical structure of the viscose material of the sheets 1 and 2 is altered, whereby the crimped area can be much more easily torn than the area such as the area "a" and "b". Further in accordance with my invention, the perforation lines 6 may be provided as shown when desired, to assist in the tearing of the viscose structure for removal of the enclosed article. These perforation lines are cuts extending through both the sheets 1 and 2. The package shown in Figs. 1–3 is adapted for high speed manufacture and is particularly useful where it is desired to individually package articles. In another use of my invention, however, it may be desired to package a multiplicity of individual articles in association with each other, and for this purpose I provide, in another form of my invention, the type of package depicted in Figs. 4 and 5.

Figure 4:
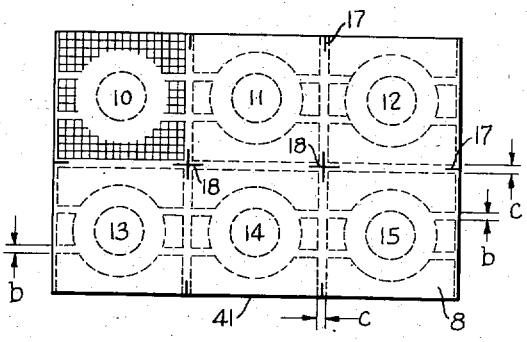
Fig. 4 is a plan view of a form of the package structure of my invention having a multiplicity of package units, such as shown in Fig. 1, separably joined to form a composite package structure.
Figure 5:
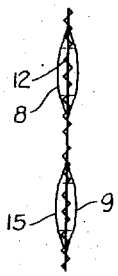
Fig. 5 is a side view corresponding to the representation of Fig. 4.

Referring to Figs. 4 and 5, there are provided opposed layers 8 and 9 of coated viscose material such as disclosed in connection with Figs. 1–3, but, in this case, of larger area so as to include a plurality of packaged articles 10—15. Each of the packaged articles is enclosed in a square of crimped area generally similar to the individual square depicted in Figs. 1–3. It will be understood, therefore, that the two larger sheets of viscose material 8 and 9, which comprise the package shown in Figs. 4 and 5, include a plurality of crimped squares adjoining one another.

For simplicity of illustration, the representation of the crimping is shown only in the square enclosing the article 10 and is omitted from the squares enclosing the articles 11—15. Separating the squares are areas "c" which have no crimping therein but which are sealed together in the heat treatment process similarly to the areas "b" in Fig. 1. These areas "c" serve as guide lines separating the individual squares and permit the separation of each individual square from the package sheet as a whole. Perforation lines 17 are provided on the edges of the guide lines "c" while perforation lines 18 are provided at the intersection of these lines. These perforations are cuts extending through the sheets 8 and 9 and are for the purpose of assisting in the separation of the individual squares containing the packaged articles. It will be seen, therefore, that the individual squares are separably joined to form a package sheet having a plurality of subdivided units each containing a packaged article.

Figure 6:
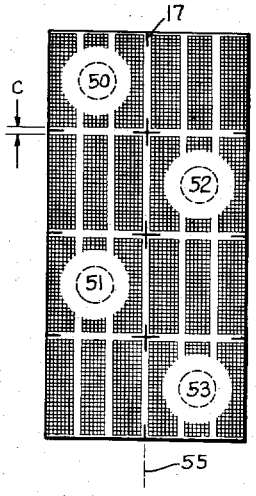
Fig. 6 is a plan view of another embodiment of my invention representing a composite package structure with staggered commodity-containing enclosure portions.
Figure 8:
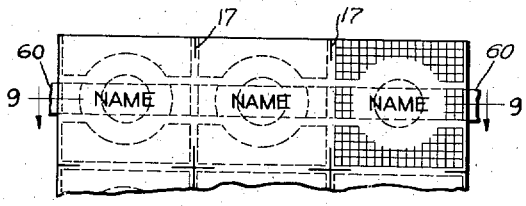
Fig. 8 is a plan view of a form of the package structure of my invention illustrating the use of indicia inserts.

Consideration will now be given to the manufacturing method for fabrication of the package just described in connection with Figs. 4 and 5. Although the description of the manufacturing method is for this certain type of package, it will be recognized that the types of packages such as shown in Figs. 1, 6, and 8, can be manufactured by a similar method, as can still other forms of packages within the scope of my invention. Referring to Fig. 10, two rolls of the coated viscose material, 20 and 21, are oppositely positioned for rotation, the viscose material being in the form of a ribbon.

The extending portion 22 of roll 20 rides over an idler roller 23 while the extending portion 24 of roll 21 rides over an idler roller 25, the roller 25 being spaced with respect to the idler roller 23. The commodity articles to be packaged are fed in a line intermediate the rollers 23 and 25, as generally indicated at 27. The ribbons of coated viscose material both extend in joined relationship between rollers 28 and 29. The rollers 28 and 29 contain heating elements for producing a sufficiently high temperature so that, as the rollers are rotated in a continuous feeding process, the heat treatment coating on the viscose ribbons 22 and 24 is melted and the structure of the viscose material itself altered to become embrittled as heretofore described. The rollers 28 and 29 are designed to seal each of the commodity articles within its commodity-containing enclosure to produce the form of package shown in Figs. 4 and 5. The rollers 28 and 29 are of a special construction which will be better understood by reference to Figs. 11 and 12.

Referring to Figs. 11 and 12, consideration will be given to the structural details of one of the rollers 28, it being understood that the roller 29 is the mechanical complement of the roller 28. The peripheral exterior of the roller 28 is provided with two adjacent rows of square areas of crimping surface 30. These surfaces correspond to the crimped areas enclosing the commodity articles in the package form of Fig. 4. In Fig. 12 only one of the squares is shown with a crimping surface, the crimped area being admitted from the other squares for simplicity in the representation of the drawings. Centrally disposed in each of the crimped areas 30 is a recess 31. Passing through each of the left hand row of recesses 31 and extending continuously from one square to another are annular slots 32 and 33. Annular slots 34 and 35 are also provided for the row of squares 30 on the right hand side of the roller 28 in Fig. 12.

On the outer edges of the roller 28, intermediate the squares 31, there are provided extending portions 17*a*. Similarly, intermediate the intersections of four of the squares 31, there are provided extending portions 18*a*. The extending portions 17*a* and 18*a* are for cutting the perforations 17 and 18 described in connection with Fig. 4. It will be understood that the crimping contour of the squares 31, as well as the extending portions 17*a* and 18*a*, engage with mechanically complementary portions in the roller element 29. The roller 29, not shown in detail, is therefore similar to the roller 28 as shown in Figs. 11 and 12, with the exception that the peripheral surface is arranged to form a sealing engagement with the squares 31 and to form a cutting engagement with extending portions 17*a* and 18*a*. Recesses are provided in the roller 28 similar to the recesses 31. These recesses in both rollers permit the commodity articles, shown at 27 in Fig. 10, to pass between the rollers, while the surrounding viscose material is sealed in an interdigitated and embrittled bond, as described in connection with Figs. 4 and 5.

Referring again to Fig. 10, as the extending portions 22 and 24 pass through the rollers 28 and 29, the commodity articles are individually sealed and a continuous sealed package structure 38 is fed to cutting knives 39 and 40. The knife 39 is stationarily mounted behind the continuously fed package structure 38, while the knife 40 rotates in the direction of the arrow. The rotation of the knife 38 is timed so that the cutting is effective intermediate the rows of the packaged articles and in alignment with the tearing guide lines and perforations shown in Fig. 4. The action of the knife element 40 in cooperation with the element 39 severs the continuous package structure 38 into individual units shown at 41. The unit 41 correspond to the package unit shown in Figs. 4 and 5.

The machine for accomplishing the process depicted in Fig. 10 is disclosed in detail in my copending application, Serial Number 748,846 filed Oct. 18, 1934. It will be understood, therefore, that it is not the purpose of the present application to disclose structural details of the mechanism employed for this purpose. It will suffice to understand that all of the operations are performed in timed relationship to produce the package unit 41 disclosed in Figs. 4 and 5.

In another form of my invention I may provide the roller elements 28 and 29 of somewhat different form to produce the package unit shown in Fig. 6. Commodity articles 50 and 51 are provided in every other square in a longitudinal series of crimped squares, while commodity articles 52 and 53 are similarly provided in another series of squares but in staggered relationship with respect to the commodity articles 50 and 51. In other words, the commodity article 52 is opposite the unoccupied square between the squares occupied by the commodity articles 50 and 51. The nature of the crimping and the sealing process is quite similar to that described in connection with Figs. 4 and 5 with the exception that the crimped squares between the squares occupied by the commodity articles are fully crimped, with the exception of the guide lines, and do not contain the commodity article enclosure 5, shown in Fig. 3.

Figure 7:
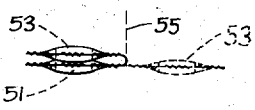
Fig. 7 is an end view of the package structure shown in Fig. 6, but after a folding operation.

The package unit shown in Fig. 6 is adapted to longitudinal folding to provide a compact package unit, as will be seen from reference to Fig. 7. Referring to Fig. 7, the package is folded along the line 55 so that the two longitudinal edges of the package are superimposed. In this position shown in Fig. 7, the enclosure for the article 53 occupies a space adjoining the enclosure for the commodity article 51. Such an arrangement produces a more compact package than if the commodity articles were positioned opposite one another.

Figure 9:
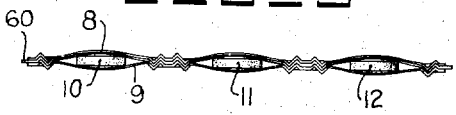
Fig. 9 is a longitudinal sectional view taken along the line 9—9 of Fig. 8.

Figs. 8 and 9 disclose a further form of my invention. Referring to Figs. 8 and 9, the package sheet depicted is similar to the sheet shown in Fig. 4 in all respects except that an indicia insert sheet 60 is provided intermediate the layers 8 and 9. The insert strip 60 occupies a space substantially coextensive with the area between the guide lines "*b*" of one of the package-enclosing crimped squares and is shown in the figures as extended slightly from the package structure proper for purposes of illustration, although in practice it may be cut off flush. The strip 60 may be of a material different from the coated viscose material, if desired, or may be of coated viscose material. The purpose of the strip is to provide an indicia means within the package adjacent the packaged article and protected from damage or deterioration, and yet directly visible to the consumer in close association with the individual packaged article. This strip may contain directions for the dosage, for example, of packaged pharmaceutical articles, or may contain advertising matter or both.

In the fabrication of such a structure, the schematic representation of Fig. 10 would include an additional roll of material for producing the strip 60 which is fed intermediate the commodity articles 27 and one of the strips 22 or 24. In the fabrication process, the bonding seal surrounding the packaged article is provided as before and the strip 60 is embrittled in the same manner as the package structure itself so that the areas of the strip 60, coextensive with the embrittled portions of the sheets 8 and 9, are similarly embrittled and form an integral part of the embrittled bonding structure.

It will now be apparent that I have provided a commodity package having many advantages and attributes which make it especially adapted for packaging of individual articles in sealed and sanitary segregation. It will also be recognized that the package of my invention is adapted to a continuous and rapid fabrication process as has been pointed out. Although I have shown certain embodiments of my package and a process of manufacture, it will be readily apparent that changes can be made by those skilled in the art which will not depart from the intended scope of my invention. I do not, therefore, desire to limit myself to the foregoing except as may be pointed out in the appended claims.

I claim:

1. A commodity package comprising opposed sheets of regenerated cellulose material bonded together to form a plurality of commodity-containing envelopes, the envelopes being joined at their edges in sheet formation and each envelope having a pocket or commodity-containing enclosure centrally disposed in a bonding area, the walls of said pocket having the normally tough and wiry nature of said cellulose material, said bonding area bounding said commodity enclosure on all sides thereof and extending from said boundary of said enclosure to the edges of the envelope, the material forming said bonding area being of an oxidized embrittled nature for permitting facile tearing of the bonding area for separation of one envelope from the sheet of envelopes and for further permitting the tearing of each envelope from the edge thereof in any direction towards the commodity enclosure to permit the removal of the commodity therefrom.

2. A package structure in accordance with claim 1 including a guide line arrangement extending from an edge of the package to the commodity enclosure to permit the guided opening of the package and removal of the commodity therefrom when desired.

3. A package structure in accordance with claim 1 in which said cellulose material is of the heat sealable type in which said bonding areas are thermally treated to an extent sufficient to produce a change in the refractive index of said material leaving the commodity-containing enclosure transparent to permit inspection of the article contained therein while the surrounding area is translucent to provide an optical accentuation of the centrally disposed commodity-containing enclosure.

4. A package structure in accordance with claim 1 in which said bonding areas include a multiplicity of adjacent minute areas disposed at different angles with respect to each other and to a plane of observation of the package to provide reflection of light from said bonding areas, regardless of from what angle viewed, to give the appearance of a sheen to emphasize and accentuate the transparent centrally disposed commodity-containing enclosure.

5. A commodity package comprising opposed sheets of regenerated cellulose material bonded together to form a pocket or commodity-containing enclosure centrally disposed in a surrounding frame of bonding area, the walls of said pocket having the normally tough and wiry nature of said cellulose material, and the areas of bond bounding said commodity enclosure on all sides thereof and extending from said boundary of said enclosure to the edges of the package, the material forming said bonding areas being of an oxidized embrittled nature for permitting facile tearing of said package structure from the edge thereof in any direction towards the commodity enclosure to permit the removal of the commodity therefrom.

6. The package in accordance with claim 5 in which said opposed layers are interdigitated in said bonding areas.

7. A package in accordance with claim 5 in which said opposed layers are interdigitated in said bonding areas and including guide lines for guiding the tearing of said embrittled structure from one side of said interdigitated layers to the commodity-containing enclosure areas, said guide lines extending in a continuous manner from one recess area to another.

8. The package in accordance with claim 5 in which said bonding areas surrounding each of said recess areas forms a subdivided unit separated from an adjacent such unit by a separation line.

9. A package in accordance with claim 5 in which the packaging material including the bonding areas surrounding one of said recess areas is separably attached to an adjoining such area.

10. A package in accordance with claim 5 in which said commodity-containing enclosures are spatially arranged in rows in echelon for forming a compact package when said package is folded upon a line extending between said rows.

11. A package in accordance with claim 5 in which at least one of said layers is transparent, and including an indicia insert visibly interposed between said layers of packaging material and forming part of the bond between said layers.

12. A package in accordance with claim 5 in which said packaging material is transparent and in which said commodity-containing enclosures are spatially arranged in longitudinal series, and including an indicia-bearing ribbon interposed between said layers of packaging material and being of a width substantially less than the width of one of said enclosures and with an indicia-bearing side thereon adjacent one side of said packaging material, said ribbon forming part of said bond in the bonding areas between said commodity-containing enclosures whereby each of said enclosures is provided with indicia means pertinent to the commodity contained therein but not totally obscuring said commodity article from external inspection through said packaging material.

13. A spot window display package for a pellet or like commodity unit comprising, a flat envelope composed of two layers of transparent heat sealable coated cellophane or the like, joined together by fused thermo-plastic material and interlocking minute deformations throughout their opposed surfaces except for a central spot, said spot remaining transparent, said deformations and thermo-plastic material holding together said layers and forming a stiffened substantially flat flange, relatively translucent to light and securing the pellet in place between the layers at said central spot and providing for the reflection of light to produce a stippled sheen effect surrounding said central spot, said pellet being clearly visible at the central transparent spot.

LEROY L. SALFISBERG.